United States Patent [19]
Kaminaka et al.

[11] 4,071,868
[45] Jan. 31, 1978

[54] NARROW TRACK MR HEAD WITH SIDE SHIELDS

[75] Inventors: Nobuyuki Kaminaka, Moriguchi; Kenji Kanai, Neyagawa; Norimoto Nouchi, Katano; Noboru Nomura, Kyoto, all of Japan

[73] Assignee: Matsushita Electric Industrial Co., Ltd., Osaka, Japan

[21] Appl. No.: 641,185

[22] Filed: Dec. 16, 1975

[30] Foreign Application Priority Data

| Dec. 20, 1974 | Japan | 49-147385 |
| Dec. 20, 1974 | Japan | 49-147386 |
| Dec. 31, 1974 | Japan | 50-1687 |
| Dec. 31, 1974 | Japan | 50-1688 |
| Jan. 9, 1975 | Japan | 50-5330 |

[51] Int. Cl.² ........................... G11B 5/12; G11B 5/30
[52] U.S. Cl. ..................................... 360/113; 360/122
[58] Field of Search ........................... 360/113; 324/46; 338/32 R; 340/174 EB; 29/603

[56] References Cited

U.S. PATENT DOCUMENTS

| Re. 26,610 | 6/1969 | De Koster | 360/113 |
| 3,493,694 | 2/1970 | Hunt | 360/113 |
| 3,731,007 | 5/1973 | Masuda et al. | 360/113 |
| 3,887,945 | 6/1975 | Nepela et al. | 360/113 |
| 3,921,217 | 11/1975 | Thompson | 360/113 |
| 3,940,797 | 2/1976 | Brock et al. | 360/113 |
| 3,967,368 | 7/1976 | Brock et al. | 360/113 |

OTHER PUBLICATIONS

Bate et al., Magnetoresistive Read Heads, IBM Technical Disclosure Bulletin, vol. 17, No. 4, Sept. 1974, pp. 967–968.

Primary Examiner—Alfred H. Eddleman
Attorney, Agent, or Firm—Stevens, Davis, Miller & Mosher

[57] ABSTRACT

A magnetic head consists of a magnetic flux converging core having a magnetic gap and a magnetoresistive effect element which forms a magnetic circuit and which is arranged in the same plane as the magnetic gap. The direction of thickness of the magnetic circuit is aligned with the direction of width of a track of a record medium, and shielding plates of ferromagnetic material are arranged on both sides of the plane.

7 Claims, 40 Drawing Figures

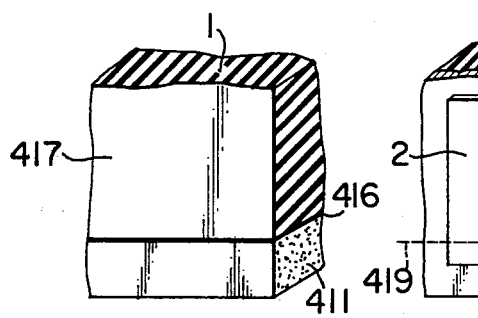
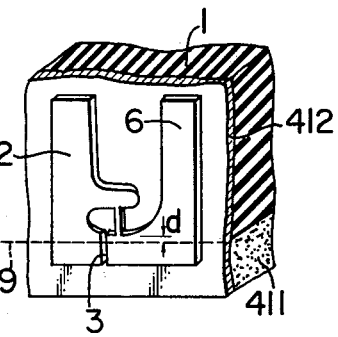
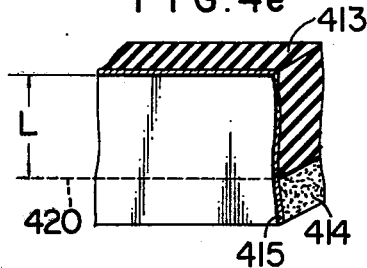
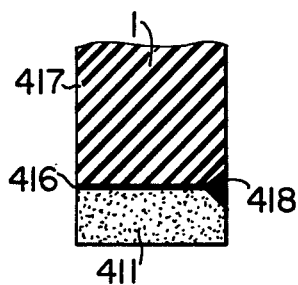

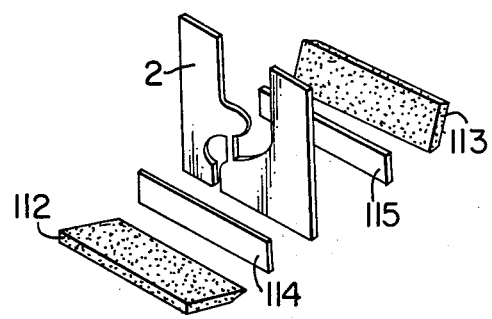
FIG.5a
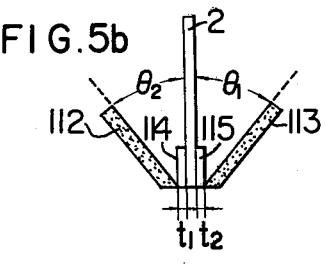
FIG.5b
FIG.5c
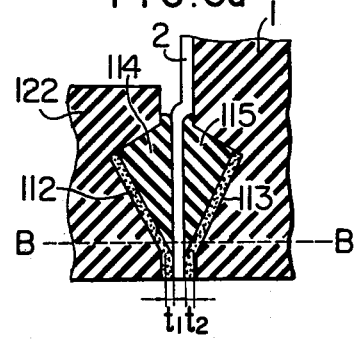
FIG.6a
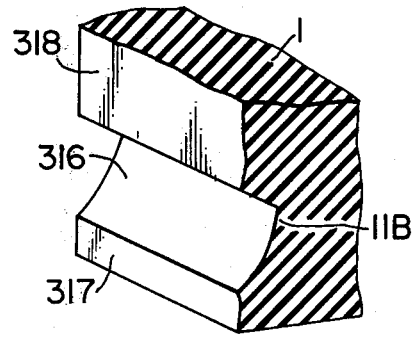
FIG.6b

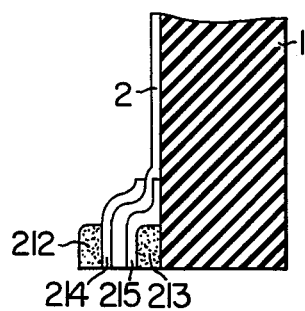
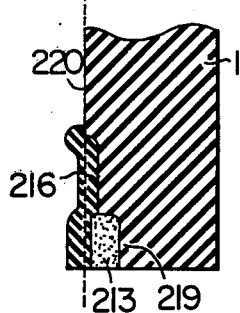 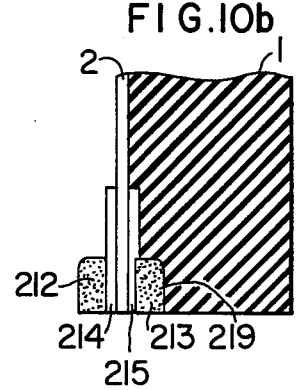
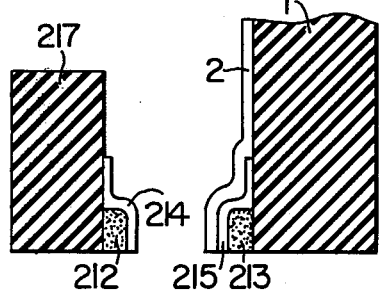 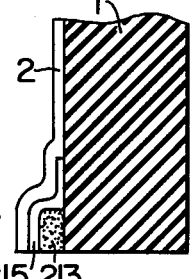 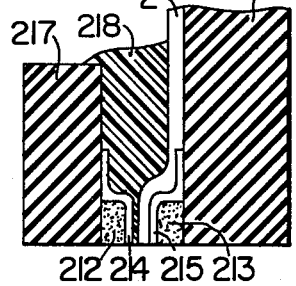

NARROW TRACK MR HEAD WITH SIDE SHIELDS

The present invention relates to a magnetic head having a shielding effect and including a magnetoresistive effect element in a plane in which a magnetic gap lies.

Various magnetic heads using the magnetoresistive effect have been known. In the so-called horizontal magnetoresistive effect head in which a ferromagnetic thin strip is abutted horizontally against a record medium, the problem of wear resistance is encountered. In the so-called vertical magnetoresistive effect head in which the ferromagnetic thin strip is abutted vertically against the record medium the above problem can be overcome but another problem exists in that the signal magnetic field from the record medium attenuates exponentially in the direction of the width of the magnetoresistive effect element so that the distribution of magnetic flux density in the magnetoresistive effect element becomes non-uniform preventing effective utilization of the small signal magnetic field. As a magnetoresistive effect head which overcomes the above problem, the structure shown in FIG. 1 has been proposed. FIG. 1 shows a magnetic flux convergence type magnetoresistive effect head in which the signal magnetic flux from a record medium 7 is detected by a gap 3 and fed to a magnetoresistive effect element 5. In manufacturing a head of this type, a ferromagnetic thin layer 2 of Fe-Ni alloy, Al-Fe-Si alloy or the like is deposited on a non-magnetic insulating substrate 1 such as a glass substrate by vacuum deposition, electrodeposition or sputtering and then a desired pattern is formed by photoetching. The ferromagnetic thin layer 2 after having been etched in a desired pattern usually comprises a magnetic flux converging core 4 having the gap 3, the magnetoresistive effect element 5 and current supplying terminals 6 for feeding a constant current $i$ to the element 5. With such a head structure, it is possible to efficiently converge the signal magnetic flux from the record medium 7 to the magnetoresistive effect element 5, the magnetic flux density in the element 5 is uniform and the signal flux can be effectively utilized, resulting in a wide dynamic range. Furthermore, the wear resistance is so high that no practical problem exists. Moreover, since the thickness of the ferromagnetic thin layer 2 defines the track width, a head having a very narrow track width such as from 2 μm to 200 A can be readily fabricated. Therefore, when such a head is used as a reproducing head, it is possible to reproduce a signal on a very narrow track and to materially increase the number of tracks per unit width on the record medium. Hence, a significant increase in the record surface density can be expected. On the other hand, as the track width is greatly reduced and the track-to-track spacing is also reduced, there occurs a problem of reproducing not only a signal from a desired track but also signals from other tracks or adjacent tracks. As an example, where there exist tracks 8, 9 and 10 recorded on the record medium 7 and the head is positioned on the track 8 to detect the signal therefrom, the reproduced output waveform of the head includes information from the track 8 as well as information from adjacent tracks 9, 10 which is picked up by leakage flux. The extent of the influence depends on the record wavelength on the track and it increases with the length of the wave.

The present invention is intended to overcome the above difficulties.

It is, therefore, a primary object of the present invention to attain a high magnetic flux convergence efficiency and shielding effect by proper selection of the spacing between ferromagnetic materials.

It is a secondary object of the present invention to shield leakage fluxes from adjacent tracks by disposing ferromagnetic material normally to a ferromagnetic thin layer.

The above and other objects, features and advantages of the present invention will become more apparent from the following detailed description of the preferred embodiments of the invention when taken in conjunction with the accompanying drawings, in which.

Figure 7A:
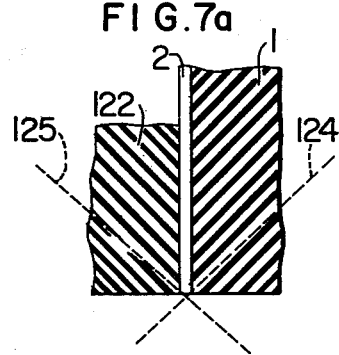
Figure 8A:
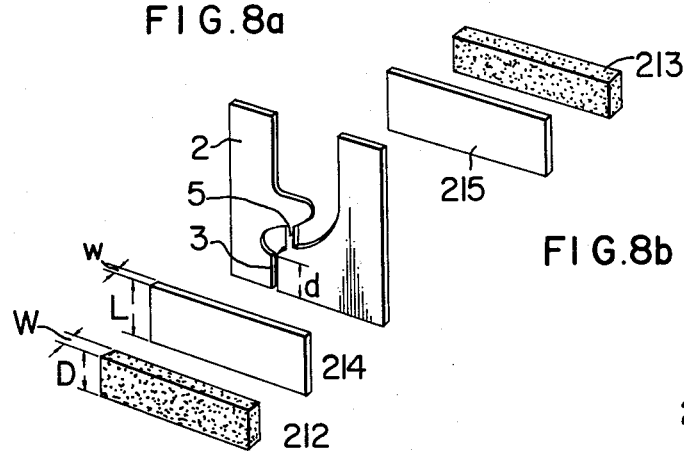
Figure 8B:
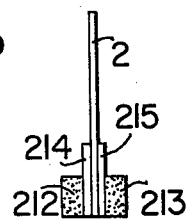
Figure 8C:
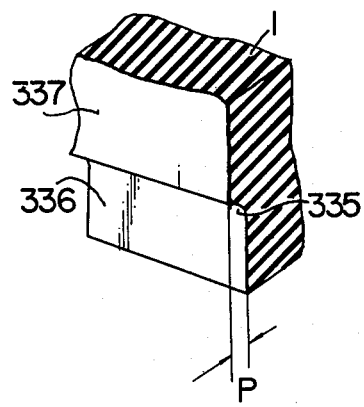
Figure 8D:
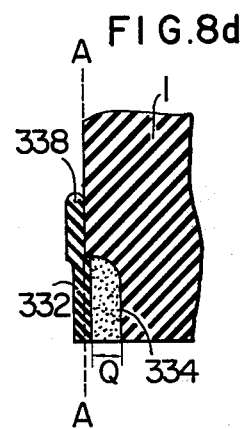
Figure 8E:
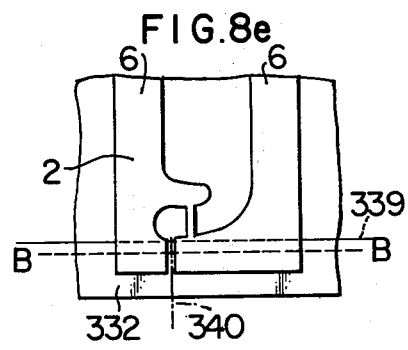
Figure 8F:
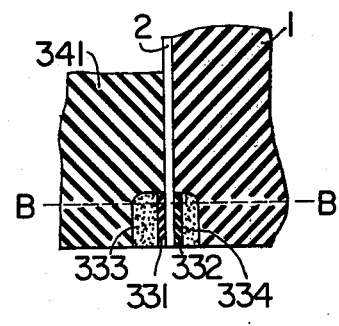
Figure 12A:
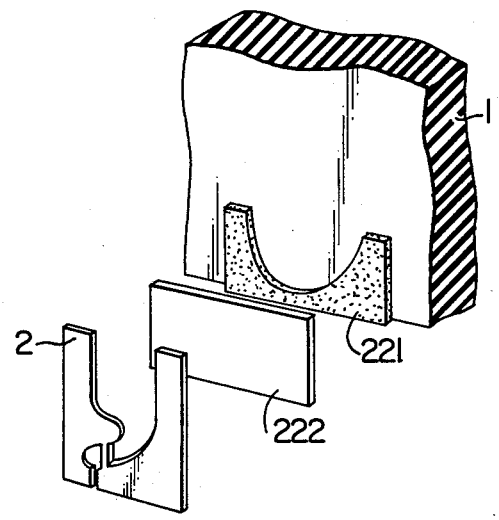
Figure 12B:
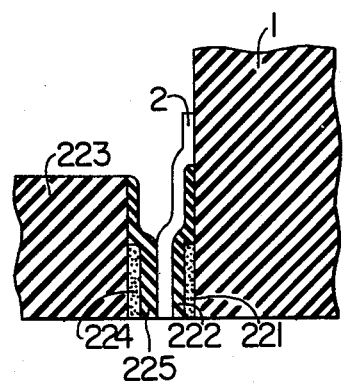
Figure 13A:
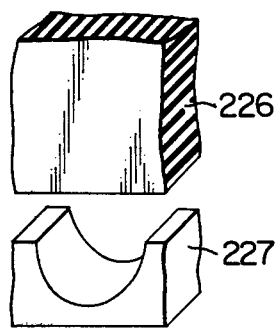
Figure 13B:
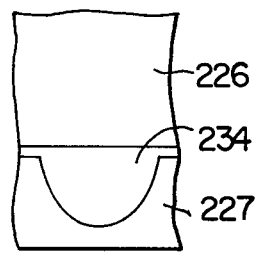
Figure 13C:
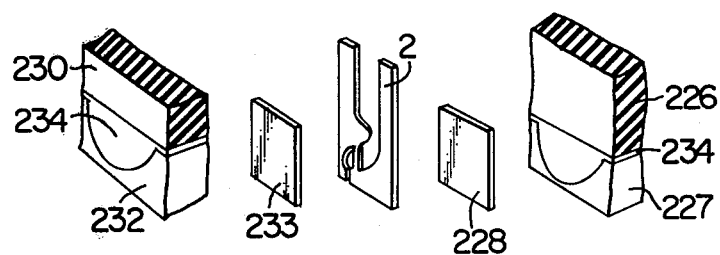
Figure 13D:
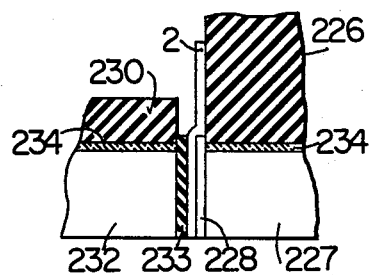

FIGS. 4(c) to (f) show intermediate steps for the second specific example;

FIG. 5(a) is an exploded view of the basic structure of a second embodiment of the present invention;

FIGS. 5(b) and (c) are sectional views thereof;

FIG. 6(a) is a sectional view of a first specific example of the second embodiment of the present invention;

FIGS. 6(b) to (f) show intermediate steps therefor;

FIGS. 7(a) and (b) show a second specific example of the second embodiment of the present invention;

FIG. 8(a) is an exploded perspective view of the basic structure of a third embodiment of the present invention;

FIG. 8(b) is a sectional view after the assembly thereof;

FIGS. 8(c) to (e) show intermediate steps therefor;

FIG. 8(f) is a sectional view of a first specific example of the third embodiment;

FIG. 9 is a sectional view showing a second specific example of the third embodiment;

FIG. 10(a) shows an intermediate step of the third embodiment of the present invention;

FIG. 10(b) is a sectional view after assembly;

FIGS. 11(a) to (c) are sectional views showing a fourth specific embodiment of the third embodiment of the present invention;

FIG. 12(a) is an exploded perspective view of a fifth specific embodiment of the third embodiment of the present invention;

FIG. 12(b) is a sectional view after assembly;

FIGS. 13(a) and (b) show intermediate steps for a modification of the fourth specific example of the third embodiment of the present invention;

FIG. 13(c) is an exploded perspective view thereof;

FIG. 13(d) is a sectional view after assembly; and

Figure 14:
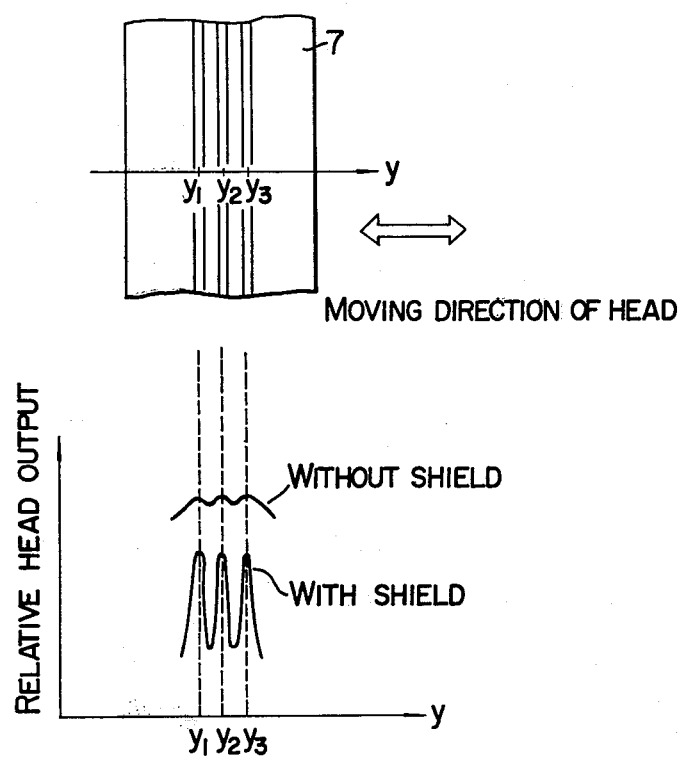

FIG. 14 illustrates the shielding effect exhibited by the head in accordance with the present invention.

Figure 1:
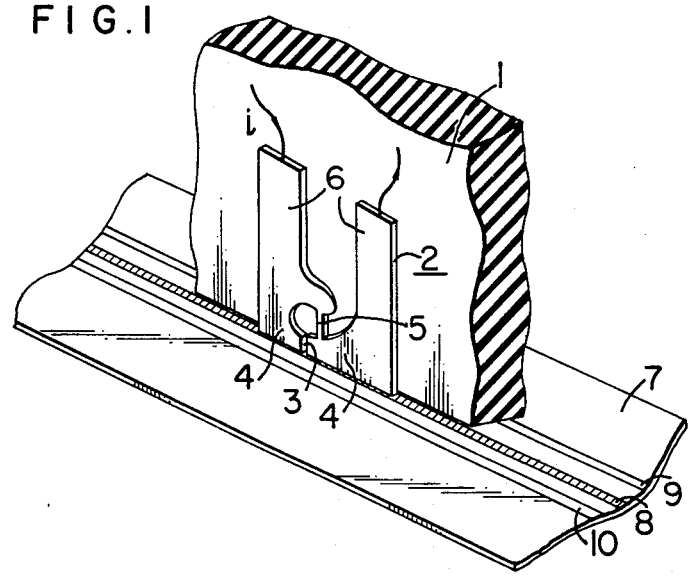
FIG. 1 is a perspective view of a prior art magnetic flux convergence type magnetoresistive effect head.
Figure 2:
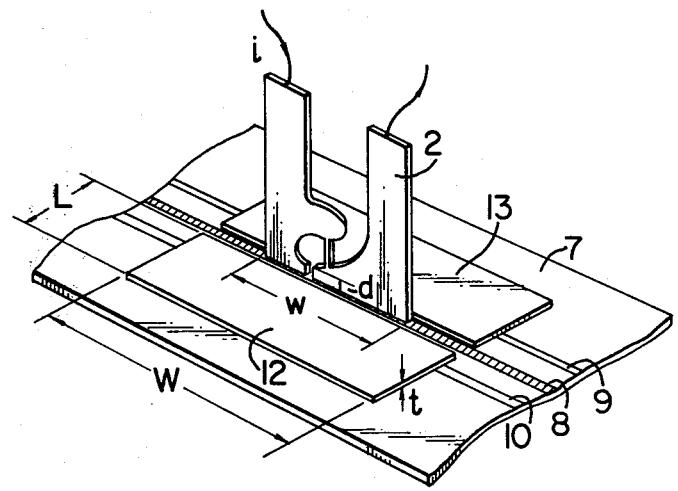
FIG. 2 is the perspective view showing a basic structure of a first embodiment of the present invention.

Referring to FIG. 2, a first embodiment of the present invention is now explained. In FIG. 2 the substrate 1 shown in FIG. 1 is omitted for clarification purpose.

As shown in FIG. 2, the basic structure of a first embodiment of the present invention includes ferromagnetic plates 12, 13 of Fe-Ni alloy, Al-Fe-Si alloy or the like disposed on both sides along the width of a track of a ferromagnetic thin layer 2 of a magnetic flux convergence type magnetoresistive effect element head, on the side facing a record medium 7 and arranged generally parallel to the record medium 7. A non-magnetic insulating material may be interposed between the ferromagnetic plates 12, 13 and the ferromagnetic thin layer 2. The dimensions of the ferromagnetic plates 12, 13, particularly an optimum width W thereof is determined by the particular pattern of the ferromagnetic thin layer 2 and it is usually selected to be equal to or larger than the width $w$ of the core. The length L is determined considering the relation between the application field of the head and the head dimension as well as the method of manufacturing the head. The thickness $t$ is determined considering the method of manufacturing the head and the gap depth $d$ of the ferromagnetic thin layer 2. The ferromagnetic plates 12, 13 hold the ferromagnetic thin layer 2 therebetween in a perpendicular position thereto or in a parallel position with respect to the record medium 7. In determining the spacings between the ferromagnetic thin layer 2 and the ferromagnetic plates 12, 13, the position of the ferromagnetic plates 12, 13 in the direction of the gap of the ferromagnetic thin layer 2 and the magnetic flux convergence effect associated with the thickness $t$ of the ferromagnetic plates 12, 13 should be considered. In order to enhance the shielding effect, it is desirable to render the above spacings as small as possible but too small spacings result in a decrease in magnetic reluctance and a decrease in magnetic flux convergence efficiency.

Figure 3A:
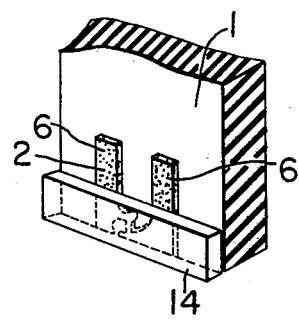
FIG. 3(a) is a perspective view of a first specific example of the first embodiment of the present invention.
Figure 3B:
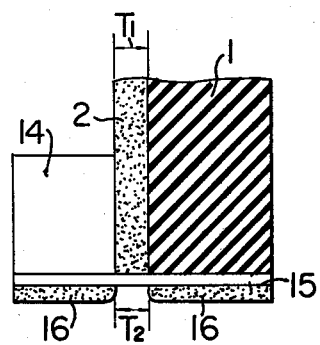
FIG. 3(b) is a sectional view of the first specific example.

FIG. 3 shows a first specific example of the first embodiment. As shown in FIG. 3(a), the ferromagnetic thin layer 2 of the magnetic flux convergence type magnetoresistive effect head formed on the non-magnetic insulating substrate 1 such as a glass substrate is secured by a non-magnetic insulating hold member 14 such as glass except of the current supplying terminal portions 6. The surface which is to face the record medium is ground to a desired contour and polished. Then, as shown in FIG. 3(b), a non-magnetic insulating plate 15 such as SiO or SiO$_2$ plate is placed on the contoured plane and then a ferromagnetic plate 16 such as Fe-Ni alloy or Al-Fe-Si alloy is deposited thereon by vacuum deposition, electrodeposition sputtering or the like (hereinafter collectively referred to as deposition). Finally, that portion of the ferromagnetic plate 16 which lies immediately below the ferromagnetic thin layer 2 is removed by pattern etching. In this case $T_2$ should be as small as possible so long as it meets the relation of $T_2 \geq T_1$. In the present specific example, it is possible to reduce the thickness of the insulating plate 15 to 0.1 - 0.2 $\mu$m or even thinner and the thickness of the ferromagnetic plate 16 to 0.1 - 0.2 $\mu$m or even thinner. However, since the thickness of the ferromagnetic plate 16 plus the thickness of the insulating plate 15 define an effective space between the record medium and the head a problem of spacing loss will occur in reproducing short wavelength signals. Further, if the thickness of the ferromagnetic plate 16 is too thin, the durability of the ferromagnetic plate 16 when it is abutted against the record medium is shortened. Accordingly, the specific example shown in FIG. 3 is considered effective as a non-contact type head such as a flying head. In this case, by properly designing a slider based on a desired space between the medium and the head, it is possible to prepare the insulating plate 15 and the ferromagnetic plate 16 of required thickness.

Figure 4A:
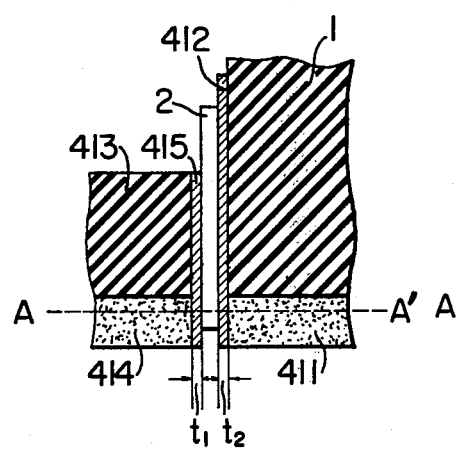
FIG. 4(a) is a sectional view of a second specific example of the first embodiment of the present invention.
Figure 4B:
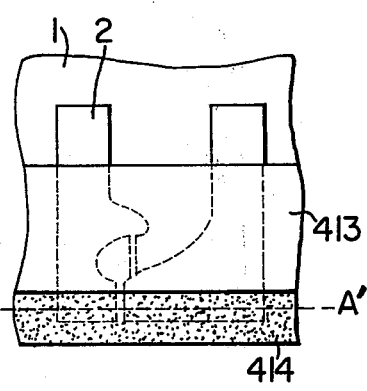
FIG. 4(b) is a front view of the second specific example.

FIGS. 4(a) to 4(f) show a second specific example of the first embodiment. FIG. 4(a) shows a sectional view of the head and FIG. 4(b) shows a front view thereof. FIGS. 4(c) to (f) illustrate manufacturing steps for the magnetic head shown in FIGS. 4(a) and (b). As shown in FIG. 4(c), non-magnetic material 1 such as glass and a ferromagnetic material 411 such as Fe-Ni alloy, Al-Fe-Si alloy are bonded together by resin or glass to form the substrate. In this case it is desirable that the resin or glass layer 416 be as thin as possible. For enhancing the strength, as shown in FIG. 4(f), one or both of the non-magnetic material 1 and the ferromagnetic material 411 may be ground at their corner on the plane opposite to the plane 417 on which the ferromagnetic thin layer 2 is to be formed, to form a wedge-shaped recess 418 which is filled with resin or glass. After bonding, the plane 417 is polished into a smooth surface. Then, as shown in FIG. 4(d), a non-magnetic insulating plate 412 such as an SiO or SiO$_2$ plate is formed on that area of the plane 417 on which the ferromagnetic thin layer 2 is to be formed. Then, Fe-Ni alloy, Al-Fe-Si alloy or the like is deposited on at least the non-magnetic insulating plate 412 and a desired pattern of the ferromagnetic thin layer 2 formed by etching or another technique. Before etching, a mask should be positioned such that a border line 419 between the non-magnetic material 1 and the ferromagnetic material 411 on the plane 417 intersects the gap 3 of the ferromagnetic thin layer 2 and the distance $d$ from the end of the gap 3 which is opposite to the end intended to face to the record medium to the border line 419 is smaller than the gap depth of the finally assembled head. Then it is exposed to light and etched. On the other hand, as shown in FIG. 4(e), a non-magnetic material 413 and a ferromagnetic material 414 are bonded together in the same manner as the substrate of FIG. 4(c) was formed, to form a support plate, one surface of which is then polished into a smooth surface, on which a non-magnetic insulating plate 415 is then deposited. Next, the subassemblies of FIGS. 4(d) and 4(e) are bonded together such that the border line 420 between the non-magnetic material 413 and the ferromagnetic material 414 aligns with the border line 419 and the ferromagnetic thin layer 2 faces the non-magnetic insulating plate 415. FIG. 4(a) shows this state. In this case, the length L from the border line 420 to the upper end of the non-magnetic material 413 on the support plate is determined such that the current supplying terminal portions 6 of the ferromagnetic thin layer 2 shown in FIG. 4(d) are not covered by the support plate. As shown in FIGS. 4(a) and (b), the head assembly is finally ground to a plane A—A and polished to obtain a desired gap depth.

According to the second specific example, since the ferromagnetic material serves as a shielding plate arranged perpendicularly to the ferromagnetic thin layer, leakage fluxes from adjacent tracks can be sufficiently shielded. Furthermore, since the shielding plate can be closely positioned with the thicknesses of the ferromagnetic thin layer 2 and the non-magnetic insulating material ($t_1$ and $t_2$ in FIG. 4(a)) being interposed therebetween, the shielding plate can be positioned at any position by adjusting the thicknesses $t_1$ and $t_2$. Because the thicknesses $t_1$ and $t_2$ can be reduced to any small values provided that the insulation ability is maintained normally on the order of 1000 - 2000 A), the shield plate can be positioned very closely even when the track density is high. Since a bulk ferromagnetic material may be used as shielding plate material and the position thereof at the gap can be controlled, the shield plate which is relatively thick may be arranged, resulting in a high wear resistance against the record medium. Moreover, since the ferromagnetic thin layer may be formed on a smooth surface, a high quality of deposited film which has less location-dependent characteristic and is free from defects such as discontinuity can be obtained. Furthermore, since the ferromagnetic materials 411, 414 are buried, the ferromagnetic thin layer 2 can make sufficient contact with the record medium so that the spacing loss can be held to a small value.

FIG. 5 shows the basic structure of a second embodiment of the present invention, in which FIG. 5(a) schematically shows an assembling process of the structure and FIG. 5(b) shows an assembled structure. As shown in FIG. 5(b), ferromagnetic plates 112 and 113 are positioned at an acute angle with respect to the ferromagnetic thin layer 2. That is, the conditions $0 < \theta_1$, and $\theta_2 < 90°$ are met where $\theta_1$ is not necessarily equal to $\theta_2$. It is important that nonmagnetic insulating plates 114 and 115 prevent the ferromagnetic plates 112 and 113 from contacting the ferromagnetic thin layer 2 although the shape and arrangement thereof may be designed as desired. The spacings $t_1$ and $t_2$ between the ferromagnetic plates 112, 113 and the ferromagnetic thin layer 2 on the plane facing the record medium are determined by the application field of the head, and since they should be narrowed as the track density increases the thicknesses of the non-magnetic insulating plates 114 and 115 on the plane facing the record medium should also be determined in connection with the above.

As shown in FIG. 5(c), the shape of the ferromagnetic plates 112 and 113 is designed such that the separation between curved surfaces 116 and 117 which face the ferromagnetic thin layer 2 and the ferromagnetic thin layer 2 increases with the distance from the record medium. It is not necessarily a thin plate as illustrated by the ferromagnetic plate 112 in FIG. 5(c), but it may be of block shape.

Figure 6C:
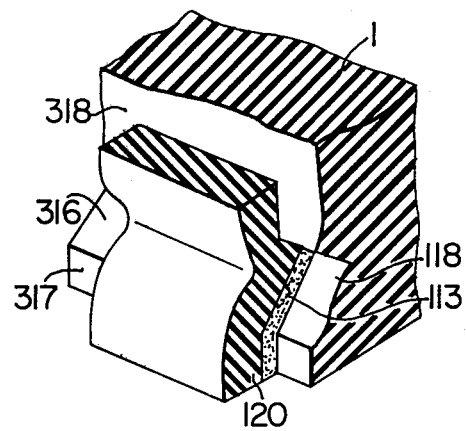

FIGS. 6(a) to (f) show a first specific example of the second embodiment. As shown in FIG. 6(a), a groove is formed in the non-magnetic insulating substrate 1 such as glass plate and a ferromagnetic plate 113 is formed in the groove. Then, a non-magnetic insulating plate 115 such as SiO or SiO$_2$ is formed thereon. The ferromagnetic thin layer 2 is then deposited and photo-etched to produce a desired pattern. On the other hand, on the non-magnetic plate 122 (which may be a glass plate), the ferromagnetic plate 112 and the non-magnetic insulating plate 114 are formed in the same manner as described above and the resulting half-assembly is held in close contact with another half at a position to assure that $t_1$ and $t_2$ are equal on the finally finished plane B—B of the head assembly with the plane of the ferromagnetic thin layer 2 facing the plane of the non-magnetic plate 114.

Figure 6D:
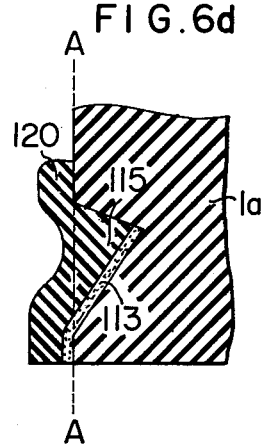
Figure 6E:
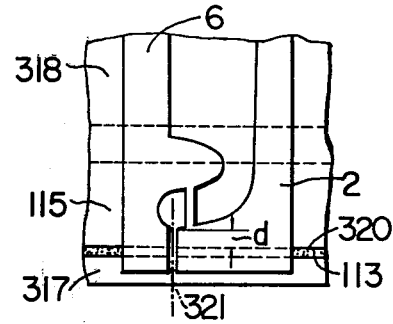
Figure 6F:
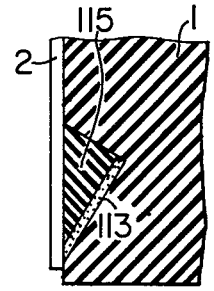

Details of a method of manufacturing the magnetic head shown in FIG. 6 is illustrated in FIGS. 6(b) to (f). As shown in FIGS. 6(b) and (c), the groove 118 is formed in the non-magnetic insulating substrate 1 (which may be a glass plate) by grinding or other means. The contour of the groove 118 is determined by the dimension of the head, angle of the arrangement of the shielding plate and the thickness thereof. Groove surface 316 and substrate surfaces 317, 318 are polished to a mirror finish. Then, Fe-Ni alloy or Al-Fe-Si alloy is deposited on the groove surface 316 and the substrate surfaces 317 to form the ferromagnetic plate 113. The non-magnetic insulating material 200 such as SiO, SiO$_2$ or glass is then deposited thereon to completely cover at least the ferromagnetic plate 113 and to fill the groove 118. Next, as shown in FIG. 6(d), the assembly is lapped to the plane A—A consisting of the substrate surfaces 317 and 318 to form a smooth plane. The remaining portion of the non-magnetic insulating material 120 forms the non-magnetic insulating plate 115 in the structure of FIG. 6(a). Then, ferromagnetic material such as Fe-Ni alloy or Al-Fe-Si alloy is deposited on the plane A—A and a desired pattern of the ferromagnetic thin layer 2 is formed by etching or other technique. Before etching, a mask is positioned such that the distance d from the border line 320 between the ferromagnetic plate 113 and the nonmagnetic insulating plate 115 on the plane A—A to the upper end of the gap of the ferromagnetic thin layer 2 corresponds to the final value of the finished head assembly and the border line 320 intersects at right angles with the gap line 321. Then it is exposed to light and etched. FIG. 6(f) shows a sectional view of FIG. 6(e). The ferromagnetic plate 112 of Fe-Ni alloy or Al-Fe-Si alloy and the non-magnetic insulating plate 114 of SiO, SiO$_2$ or glass are formed on a non-magnetic insulating support plate 122 such as glass plate in the same manner as the ferromagnetic plate 113 and the non-magnetic insulating plate 115 were formed on the substrate 1. The resulting half-assembly is bonded with another half such that the border line between the ferromagnetic plate 112 and the non-magnetic insulating plate 114 on the support plate 122 aligns with the border line 320 and the ferromagnetic thin layer 2 faces the non-magnetic insulating plate 114. In this case it is important that the size of the support plate 122 or its positional relation to the substrate 1 should be determined to prevent the current supplying terminals 6 of the ferromagnetic thin layer 2 from being completely covered. As seen from FIG. 6(a) which shows the finally assembled state, the head is finally ground to the plane B—B and polished to obtain the desired thicknesses $t_1$ and $t_2$.

Figure 7B:
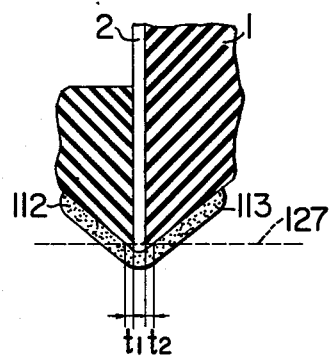

FIGS. 7(a) and 7(b) show a second specific example of the second embodiment. As shown in FIG. 7(a), the ferromagnetic thin layer 2 of the magnetic flux convergence type magnetoresistive effect head formed on the substrate 1 and the non-magnetic support plate 122 of glass or the like are bonded together and the bonded assembly is cut on planes 124 and 125 which pass through the end of the ferromagnetic thin layer 2 that abuts against the record medium and which make acute angles with the ferromagnetic thin layer 2. The cut surfaces are polished to mirror surfaces and the ferromagnetic plates 112 and 113 of Fe-Ni alloy, Al-Fe-Si alloy or the like are deposited on the mirror surface. Then they are ground and lapped to the final finishing surface 127 to obtain the desired thicknesses $t_1$ and $t_2$. In the present example, non-magnetic insulating plates 114 and 115 are not used. With the above structure, as shown in FIG. 5(a), the ferromagnetic plates 112 and 113 may be disposed on opposite sides of the gap of the ferromagnetic thin layer 2, in proximity thereto, and they function as shielding plates to shield the leakage fluxes from adjacent tracks. Furthermore, since they make acute angle with the ferromagnetic thin layer 2, the shielding effect is attained without greatly reducing the magnetic reluctance at the gap of the head and hence without substantially decreasing the efficiency of convergence of the signal flux from the record medium to the magnetoresistive effect element. In this case the process of manufacturing the shield plate is simple and the number of steps required is reduced.

The method of FIG. 7 is simpler to carry out during manufacturing than that of FIG. 6. That is, the formation of the magnetic shields is easier. For example, unlike the method of FIG. 6, the surface of the magnetic circuit element need not be made smooth.

FIGS. 8(a) and (b) show the basic structure of a third embodiment of the present invention, of which FIG. 8(a) is an exploded perspective view of the structure and FIG. 8(b) shows an assembled structure. Non-magnetic insulating plates 214 and 215 are arranged generally in parallel with the ferromagnetic thin layer 2. The smaller the width w of the non-magnetic insulating plates 214 and 215, the closer the ferromagnetic plates 212 and 213 can be positioned to the ferromagnetic thin layer 2 so that it will be effective in shielding the leakage fluxes from the adjacent tracks when the track density is high. However, since too small a valve of w results in decrease in the magnetic reluctance at the gap 3 of the ferromagnetic thin layer 2 and hence a decrease in ratio at which the signal flux is passed to the magnetoresistive effect element 5, that is, the magnetic flux convergence efficiency, an appropriate thickness w should be determined taking the above into consideration. The thickness w of the ferromagnetic plates 212 and 213 are determined by the application field of the head and the dimension of the head as well as the manufacturing method thereof. The width D is determined in connection with the gap depth d, and the smaller it is the more effective is the magnetic flux convergence efficiency. The width L of the non-magnetic insulating plates 214 and 215 must be sufficiently large to electrically separate the ferromagnetic plates 212 and 213 from the ferromagnetic thin layer 2. FIG. 8(f) shows a first specific example of the third embodiment, detailed manufacturing steps of which are illustrated in FIGS. 8(c) to (e). A groove 355 is formed in the substrate 1. The contour of the groove 335 is determined by the dimension of the head and the thickness of the shielding plate. Groove surface 336 and substrate surface 337 are polished to a mirror finish. Then ferromagnetic plate 334 is mask deposited on the groove surface 336. The thickness Q of the ferromagnetic plate 334 is smaller than the depth P of the groove 335 the amount P - Q is controlled to be the desired thickness of the non-magnetic insulating plate 332. Then, non-magnetic insulating material 338 is deposited to completely cover at least the ferromagnetic plate 334 and to fill the groove 335. Next, as shown in FIG. 8(d), the assembly is lapped to the plane A—A to obtain a smooth surface. A desired pattern, as shown in FIG. 8(e), of the ferromagnetic thin layer 2 is then formed on the plane A—A. In the pattern etching process, a mask is positioned such that a border line 339 which represents the end of the ferromagnetic plate 334 which is opposite the end facing to the record medium superimposes with the end of the gap of the ferromagnetic thin layer 2 which is opposite to the end facing the record medium, or the former is positioned closer to the record medium than the latter, and the former intersects at right angle with the gap line 340. Then it is exposed to light and etched. FIG. 8(f) shows a sectional view of the finally assembled structure. The ferromagnetic plate 333 and the non-magnetic insulating plate 331 are formed on the support plate 341 in the same manner as the ferromagnetic plate 334 and the non-magnetic insulating plate 332 are formed on the substrate 1. The resulting half-assembly is bonded with another half such that a border line representing the end of the ferromagnetic plate 333 in the support plate 341 which is opposite to the end facing the record medium aligns with the border line 339, and the ferromagnetic thin layer 2 faces the non-magnetic insulating plate 331. In this case, the size of the support plate 341 and is positional relation to the substrate 1 should be determined to prevent the current supplying terminals 6 of the ferromagnetic thin layer 2 from being completely covered. Then, the head assembly is finally ground to the plane B—B and polished to attain the desired gap depth.

According to the present example, by forming the groove in the substrate or the support plate, the ferromagnetic body which serves as the shielding plate can be buried, and by lapping the assembly after filling the non-magnetic insulating material, the ferromagnetic thin layer which serves as a head block can be deposited on a smooth surface resulting in a stable layer, the characteristic of which is less dependent on the location. Furthermore, since there is no step or shoulder, a defect such as a discontinuity does not appear. By changing the contour of the groove, it is possible to arrange a shield of any shape at any relative positioned relation to the ferromagnetic thin layer, and hence the construction of the shielding plate which enhances the shielding effect without significantly reducing the magnetic reluctance at the gap can be attained. Furthermore, since the spacing, near the gap, between the ferromagnetic plate constituting the shielding plate and the ferromagnetic thin layer can be controlled at substantially the same accuracy as the thickness of the deposited film is controlled, the shielding plate can be positioned at a sufficiently small spacing so that the leakage fluxes from adjacent tracks can be effectively shielded even when the track density is high.

FIG. 9 shows a second specific example of the third embodiment, in which the ferromagnetic plate 213, the non-magnetic plate 215 and the ferromagnetic thin layer 2 are sequentially formed on the non-magnetic substrate 1, and the ferromagnetic thin layer 2 is photo-etched into a desired pattern. The non-magnetic plate 214 is further deposited thereon, and the ferromagnetic plate 212 is then deposited thereon. FIGS. 10(a) and 10(b) show a third specific example of the third embodiment. As shown in FIG. 10(a), a groove 219 is formed in the non-magnetic substrate 1 and the ferromagnetic plate 213 is deposited on the groove and then the non-magnetic material 216 such as SiO or $SiO_2$ is deposited to form the non-magnetic plate 215. Next, the assembly is cut to the plane 220 of the substrate 1 and polished to obtain a smooth surface.

The ferromagnetic thin layer 2 is then deposited on the plane and etched into a desired pattern, on which the non-magnetic insulating plate 214 and the ferromagnetic plate 212 are deposited in sequence. FIG. 10(b) shows the final arrangement.

FIGS. 11(a) to 11(c) show a fourth example of the third embodiment. The structure of FIG. 11(b) is constructed in the same manner as the first example shown in FIG. 9 until the ferromagnetic thin layer 2 is formed, but the subsequent steps differ. As shown, ferromagnetic plate 212 and non-magnetic plate 214 are deposited on non-magnetic support plate 217 of glass or the like and the resulting assembly is bonded with the first assembly by resin 218 or the like.

With the above structure, the ferromagnetic plates 214 and 215 can be arranged close to the width of the track of the ferromagnetic thin layer 2. Moreover, since the layers of the ferromagnetic material and non-magnetic material can be formed in sequence on the substrate, it is possible to precisely and readily control the positional relationship of the shielding plate and the magnetoresistive effect head by effectively utilizing mask deposition and mask etching. The manufacturing process can also be simplified and the yield increased.

A fifth specific example of the third embodiment which has an improved magnetic shielding plate is now explained with reference to FIGS. 12(a), (b) and FIGS. 13(a) to (d). As shown in FIG. 12(a), the ferromagnetic plate 221 is formed on the non-magnetic insulating substrate 1. The ferromagnetic plate 221 has a concave contour which is narrowest at a portion facing the gap of the head constituted by the ferromagnetic thin layer 2 and which faces a portion of the gap. The non-magnetic insulating plate 222 is then deposited. The ferromagnetic thin layer 2 is further deposited thereon and it is subsequently etched into a desired pattern with a positional such that the narrowest portion of the ferromagnetic plate 221 faces the gap. On the other hand, ferromagnetic plate 224 having substantially the same geometry as that of the ferromagnetic plate 221 is formed on the support plate 223 (which may be a glass plate) and non-magnetic insulating plate 225 is further deposited thereon. The resulting assembly and the first assembly are bonded together such that the ferromagnetic thin layer 2 faces the insulating plate 225. In this case, they are assembled such that the narrowest portion of the concave ferromagnetic plate 224 faces a portion of the gap of the head.

FIGS. 13(a) to 13(d) show another structure. A non-magnetic insulating substrate 226 of glass or the like and a ferromagnetic body 227 which has been previously ground to have a concave contour are glass-bonded together and one side of the assembly is polished to a mirror surface. The glass 234 must sufficiently fill the gap formed by the substrate 226 and the ferromagnetic body 227. A non-magnetic insulating plate 228 and then the ferromagnetic thin layer 2 are deposited on the mirror surface and the ferromagnetic thin layer 2 is etched into a desired pattern. The pattern is etched such that the gap faces the narrowest portion of the concave ferromagnetic plate 227 and also faces a portion of the gap depth. On the other hand, a non-magnetic insulating support plate 230 is glass-bonded to a concave ferromagnetic body 232 through glass 234 in the same manner as shown in FIGS. 13(a) and (b). One surface of the assembly is polished to a mirror surface, and a non-magnetic insulating plate 233 is deposited on the mirror surface. These assemblies are bonded together such that the ferromagnetic thin layer 2 faces the non-magnetic insulating plate 233. FIG. 13(c) shows the sequence of assembly in a simplified form and FIG. 13(d) shows an assembled structure. Although FIGS. 12(b) and 13(d) show the structures after assemblied, the structures are polished before they are actually used so that the surfaces facing the record medium present predetermined contours and the proper gap depths are assured.

While the shielding plate is arranged in parallel with the ferromagnetic thin layer 2, since only a portion of the gap depth faces the shield at the gap the shielding effect can be attained without significantly reducing the magnetic reluctance at the gap of the head and hence without substantially reducing the efficiency at which the signal flux from the record medium is converged to the magnetoresistive effect element.

With the arrangement of the present invention as described above, an excellent shielding effect as shown in FIG. 14 is attained. Let us assume that signals of relatively long wavelength are recorded in tracks $y_1$, $Y_2$ and $Y_3$ on the direction of the width $y$ of the record medium 7, and an output from the head is observed while moving the head in the direction of $y$. When there is no shield, the head reproduces not only the signal from the normal track but also the leakage fluxes from adjacent tracks. As a result, the head output is large but the S/N ratio is low and resolution power in the direction of track width is very poor. On the other hand, in the magnetic head provided with the shield in accordance with the present invention, the leakage fluxes from the adjacent tracks can be effectively shielded and the resolution power in the direction $y$ or in the direction of track width is materially improved.

This is also advantages in facilitating the positioning of the head or tracking thereof. Furthermore, when the shield is used, the signal components from the adjacent tracks which exist in the head output can be significantly reduced so that the rate of erroneous operation can be reduced for digital recording and so-called crosstalk can be reduced for analog recording.

What is claimed is:

1. A magnetic head for use with a record medium having at least one track therein, comprising:
   a magnetic circuit element including,
   a ferromagnetic material section having a magnetic gap, and
   a magnetoresistive effect element section situated in the same plane as said ferromagnetic material section, and
   ferromagnetic shielding plates positioned on both sides of said magnetic circuit element, the thickness direction of said magnetic circuit element coinciding with the width direction of a track in said record medium.

2. A magnetic head according to claim 1, wherein said shielding plates are substantially parallel to a surface of said magnetic head which abuts against said record medium.

3. A magnetic head according to claim 1, wherein said shielding plates are each laminated in a direction substantially parallel to the plane of said magnetic circuit element.

4. A magnetic head according to claim 1, wherein the spacing between said shielding plates increases with the distance from said surface of the record medium.

5. A magnetic head according to claim 1, wherein said shielding plates are of generally concave shape with the surface thereof which abuts against said record medium being a bottom, and the most deeply recessed portion of said concave shape being aligned with said gap.

6. A magnetic head according to claim 1 which further includes a non-magnetic substrate having a groove formed in the surface thereof and wherein said shielding plates comprise layers of ferromagnetic material, said ferromagnetic material layers being formed in said groove.

7. A magnetic head according to claim 6, wherein insulating material layers are disposed on said ferromagnetic material layers in said groove, the surfaces of said insulating material layers and the surface of said substrate being smooth, and said magnetic circuit element is disposed on said smooth surfaces.

* * * * *